United States Patent
Osterhout et al.

(10) Patent No.: US 6,965,614 B1
(45) Date of Patent: Nov. 15, 2005

(54) METHOD AND SYSTEM FOR COMMUNICATIONS BETWEEN DIFFERENT TYPES OF DEVICES

(75) Inventors: Gregory T. Osterhout, Coppell, TX (US); James A. Mcalear, Stittsville (CA); Mark A. Sosebee, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/557,530

(22) Filed: Apr. 24, 2000

Related U.S. Application Data (63) Continuation-in-part of application No. 09/439,501, filed on Nov. 12, 1999.

(51) Int. Cl.[7] ............................................. H04J 3/16
(52) U.S. Cl. ....................................................... 370/466
(58) Field of Search ............................... 370/465–469, 370/395.5–395.53; 710/62, 104, 129, 110

(56) References Cited

U.S. PATENT DOCUMENTS

| | | | | |
|---|---|---|---|---|
| 5,784,581 | A | * | 7/1998 | Hannah ...................... 710/110 |
| 5,890,015 | A | * | 3/1999 | Garney et al. ................ 710/62 |
| 6,081,533 | A | * | 6/2000 | Laubach et al. |
| 6,252,544 | B1 | * | 6/2001 | Hoffberg |
| 6,278,478 | B1 | * | 8/2001 | Ferriere |
| 6,453,034 | B1 | * | 9/2002 | Donovan et al. |
| 6,584,490 | B1 | * | 6/2003 | Schuster et al. |
| 6,584,519 | B1 | * | 6/2003 | Russell ........................ 710/62 |

OTHER PUBLICATIONS

Steve Donovan, et al., *The SIP Info Method*, Internet Draft, pp. 1-7 (Jun. 1999).
Steve Donovan, *The SIP Info Method*, Internet Draft, pp. 1-10 (Feb. 2000).
Jon Crowcroft, *Comments About H.323 and SIP*, pp. 1-6, printed from web site http://www.cs.columbia.edu (Jan. 22, 1998).
*Comparison of H.323 and SIP*, pp. 1-5, printed from web site http://www.cs.columbia.edu, dated at least as early as Feb. 3, 2000.
Information Sciences Institute, *Internet Protocol, Darpa Internet Program Protocol Specification*, RFC 791, pp. 1-48 (Sep. 1981).
J. Postel, *User Datagram Protocol*, RFC 768, pp. 1-3 (Aug. 1980).

(Continued)

*Primary Examiner*—Chi Pham
*Assistant Examiner*—Thai Hoang
(74) *Attorney, Agent, or Firm*—Trop, Pruner & Hu, P.C.

(57) ABSTRACT

A communications system includes a packet-based data network coupled to various network elements, including a gateway that provides ports to various peripheral devices. One type of peripheral device includes a Universal Serial Bus (USB) device. A network element coupled to the data network may establish Session Initiation Protocol (SIP) sessions with the gateway. Once a SIP session is established, communications may occur between the network element and the peripheral device. SIP messaging is exchanged between the network element and the gateway. USB commands and data are exchanged between the gateway and the USB device. The gateway converts between the SIP messaging and the USB commands and data.

28 Claims, 9 Drawing Sheets

OTHER PUBLICATIONS

M. Handley, et al., *SDP: Session Description Protocol*, RFC 2327, pp. 1-39 (Apr. 1998).

H. Schulzrinne, et al., *RTP: A Transport Protocol for Real-Time Applications*, RFC 1889, pp. 1-69 (Jan. 1996).

S. Deering, et al., *Internet Protocol, Version 6 (IPv6) Specification*, RFC 2460, pp. 1-36 (Dec. 1998).

M. Handley, et al., *SIP: Session Initiation Protocol*, RFC 2543, pp. 1-153 (Mar. 1999).

Adam Roach, *Event Notification in SIP*, Internet Draft, pp. 1-8 (Mar. 2000).

Scott Petrack, et al., *The Pint Service Protocol: Extensions to SIP and SDP for IP Access to Telephone Call Services*, Internet Draft, pp. 1-59 (Oct. 14, 1999).

Jiri Kuthan, *Sample Uses of SIP Info With Varying Reliability Needs*, Internet Draft, pp. 1-7 (Oct. 17, 1999).

Robert Sparks, et al., *SIP Telephony Service Examples With Call Flows*, Internet Draft, pp. 1-79 (Oct. 1999).

Universal Serial Bus Specification, pp. 31-72 and 207-227, Revision 1.1, dated Sep. 1998.

\* cited by examiner

METHOD AND SYSTEM FOR COMMUNICATIONS BETWEEN DIFFERENT TYPES OF DEVICES

This is a continuation-in-part of U.S. patent application Ser. No. 09/439,501, entitled "Local Area Network Accessory for Integrating USB Connectivity in Existing Networks," filed Nov. 12, 1999.

FIELD OF THE INVENTION

The invention relates to communications between different types of devices, and more particularly, to converting data between different protocols in communications between the different types of devices.

BACKGROUND

Data networks are widely used to link various types of network elements, such as personal computers, servers, gateways, network telephones, and so forth. Data networks may include private networks (such as local area networks or wide area networks), and public networks (such as the Internet). Popular forms of communications between network elements across such data networks include electronic mail, file transfer, web browsing, and other exchanges of digital data.

With the increased capacity and reliability of data networks, voice and multimedia communications (including telephone calls, video conferencing, and so forth) over data networks have become possible. Voice and multimedia communications over data networks are unlike voice and multimedia communications in a conventional circuit-switched network such as the public switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data, and other forms of multimedia streaming data sent over a data network typically share network bandwidth with conventional non-streaming data (e.g., data associated with electronic mail, file transfer, web access, and other traffic).

Various standards have been proposed for audio and multimedia communications over data networks. One such standard is the H.323 Recommendation from the International Telecommunications Union (ITU), which describes terminals, equipment and services for multimedia communications over data networks. Another standard for audio and multimedia communications is the Session Initiation Protocol (SIP), which establishes, maintains, and terminates multimedia sessions over a data network. SIP is part of a multimedia data and control architecture developed by the Internet Engineering Task Force (IETF).

A communications network may include a collection of different types of terminals, such as terminals coupled to packet-based networks (e.g., computers, network telephones, etc.) and terminals coupled to circuit-switched networks (e.g., standard analog or digital telephones). Inter-operation between different types of terminals may be possible, and may be accomplished by use of some type of a gateway, such as a PSTN gateway, which converts between packet-based data and circuit-switched data in a call session.

Although improvements in technology have improved inter-operability between certain different types of devices (such as packet-based telephony devices and circuit-switched telephony devices), a need continues to exist for providing inter-operability among other combinations of devices. For example, a computer system may be coupled to many different types of peripheral devices. One type of computer peripheral device is the Universal Serial Bus (USB) device, which may include a printer, scanner, camera, telephone, keyboard, mouse, joystick, or another type of peripheral device. Although peripheral devices coupled to a computer system may be readily available to a user of the computer system, it may not be available remotely.

SUMMARY

In general, according to one embodiment, a method of communications between a first device and a peripheral device coupled over a network includes receiving, by a system, a message from the first device to establish a communications session with the peripheral device. The message is according to a first protocol defining real-time interactive sessions. A communications session is established between the first device and the system over a network. The system converts between data according to the first protocol and data according to a second protocol defining a peripheral link from the system to the peripheral device.

Advantages offered by some embodiments of the invention may include one or more of the following. By providing the ability of a first device (such as a telephony device or other device capable of participating in streaming communications sessions) to communicate with a peripheral device, inter-operability between such devices may be achieved. Thus, for example, a SIP or H.323 device may be used to access the functionality of another type of device, such as a computer peripheral device (e.g., a Universal Serial Bus device). This enables access by a remote user of the many functionalities provided by peripheral devices.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the Session Initiation Protocol (SIP) in some described embodiments, other embodiments may employ other protocols for real-time interactive sessions over packet-based data networks.

Figure 1:
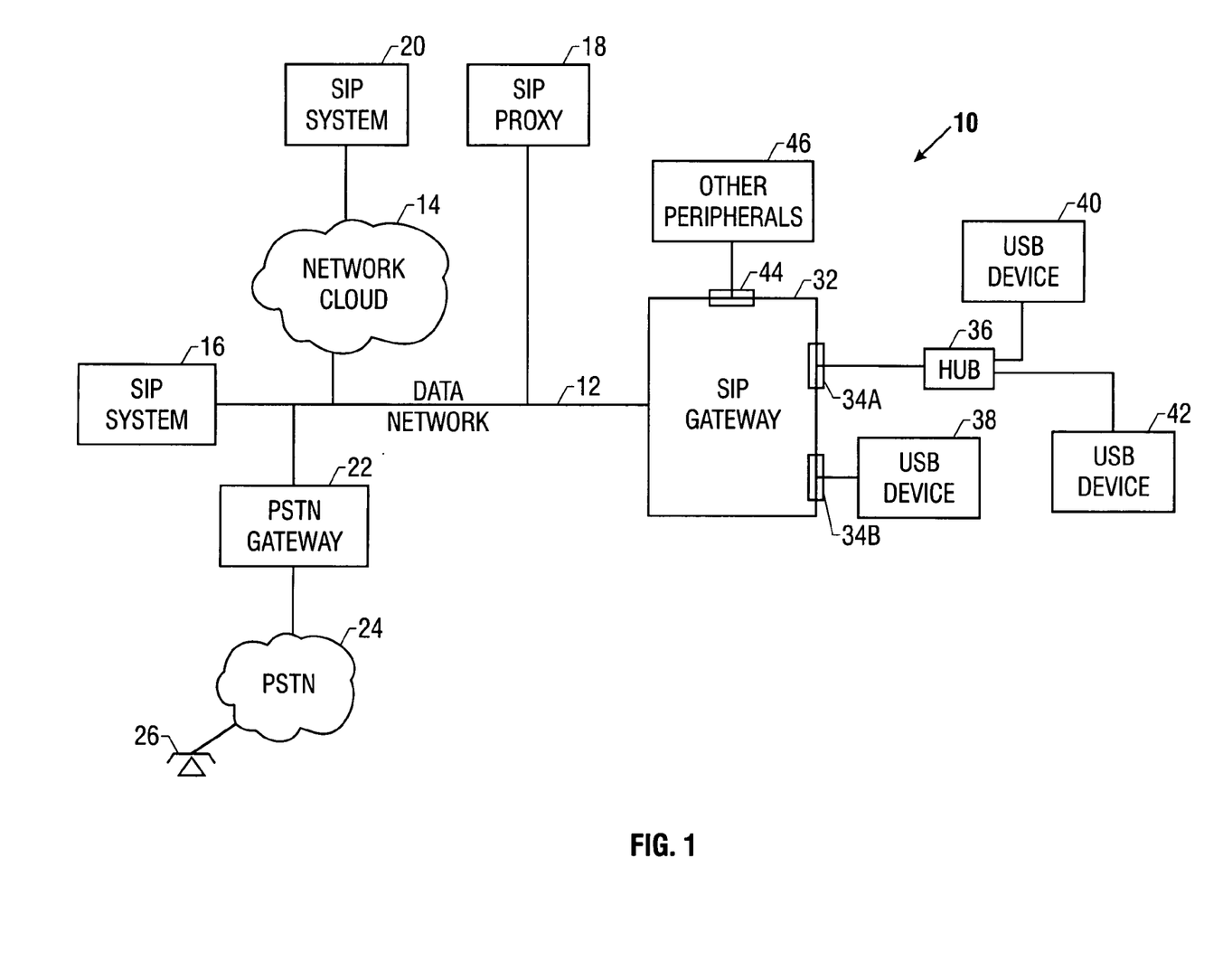
FIG. 1 is a block diagram of an embodiment of a communications system including a gateway system.

Referring to FIG. 1, a communications system 10 in accordance with one embodiment includes a packet-based data network 12 over which various communications sessions may be established. The packet-based data network 12 may be a packet-switched network, such as an Internet Protocol (IP) network. One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998.

Packet-switched networks are based on a connectionless internetwork layer. Unlike circuit-switched networks, which provide a dedicated end-to-end connection or physical path for the duration of a call session, a packet-switched network is one in which the same path may be shared by several network elements. Packets or other units of data injected into a packet-switched data network may travel independently over any path (and possibly over different paths) to a destination point. The packets may even arrive out of order. Routing of the packets is based on one or more addresses carried in each packet.

The packet-based network 12 may also be connection-oriented, such as an ATM (Asynchronous Transfer Mode) network or a Frame Relay network. In a connection-oriented, packet-based network, a virtual circuit or connection is established between two end points. In such connection-oriented networks, packets are received in the same order in which they were transmitted.

The data network 12 is coupled to various network elements 16, 18, 22, and 32, which may be capable of establishing communications sessions on the data network 12 according to a Session Initiation Protocol (SIP). The data network 12 may also be coupled through a network cloud 14 (which may be a public network such as the Internet or a private wide area network) to another network element 20 that is also capable of performing SIP communications. A "data network" or "network" may refer to one or more communications networks, links, channels, or paths (wired, wireless, or both), as well as systems or devices (e.g., routers) used to route data between elements through such networks, links, channels, or paths. In the ensuing discussion, reference to "data network 11" may refer to the combination of the data network 12, the network cloud 14, and other networks. In other embodiments, the various network elements coupled to the data network 11 may be capable of H.323 or other forms of streaming communications.

As used here, a "call session" or "streaming call session" refers generally to either an audio (e.g., voice) or a multi-media session in which streaming data is being communicated between two or more network elements (and parties using those elements) coupled to the data network 11 (or any other packet-based data network). A "communications session" may more generally refer to streaming call sessions as well as other types of communications in which any type of data may be exchanged.

An "interactive" call session refers to a call session in which two or more parties are involved in an exchange of audio (e.g., voice) and/or video data in an established session between two or more network elements. A "real-time" interactive call session refers to an exchange of data, such as audio and/or video data, on a substantially real-time basis between two terminals. A session is substantially real-time if interaction is occurring between two end points or parties, with a communication from one end followed relatively quickly by a response or another communications from the other end, typically within seconds, for example. Interactive call sessions are contrasted with electronic mail messaging, for example, in which a first participant sends a message over a data network to a second participant. No indication is usually provided back to the first participant that the second participant has received the message or that the second participant is even at his or her terminal. In contrast, an interactive call session involves a request followed by some acknowledgment that a called party has accepted the call session. This enables establishment of an interactive call session in which participants exchange data.

SIP is part of the multimedia data and control architecture from the Internet Engineering Task Force (IETF). A version of SIP is described in RFC 2543, entitled "SIP: Session Initiation Protocol," dated in 1999. SIP may be used to initiate call sessions as well as to invite members to a session that may be advertised by some other mechanism, such as electronic mail, news groups, web pages, and other mechanisms. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327, for describing multimedia sessions; and the Session Announcement Protocol (SAP) for advertising multimedia sessions by multicast.

Other standards may be employed in further embodiments for controlling communications sessions over the data network 11. One such other standard includes the H.323 Recommendation from the International Telecommunication Union (ITU).

SIP network elements may be classified as SIP clients, SIP servers, and SIP proxies. A SIP client system includes a client application program that is capable of sending SIP requests to perform call requests. A SIP server system may include an application program that accepts SIP requests to service calls and to send back responses to SIP requests. A network element can be a SIP client at certain times (when it is generating requests) and a SIP server at other times (when it is responding to requests). A SIP proxy system may include an intermediary program that acts as both a server and a client for making requests on behalf of other clients. In FIG. 1, the network elements 16, 20, and 22 may be SIP client or server systems, and the network element 18 may be a SIP proxy system. Examples of the SIP systems 16 and 20 include network telephones, computer systems, and other devices or systems.

The network element 22 may be a public switched telephone network (PSTN) gateway 22 that is coupled to a PSTN 24. Standard circuit-switched telephones 26 are coupled to the PSTN 24. The PSTN gateway 22 may be capable of translating telephony signaling and data between a circuit-switched format (for communication over the PSTN 24) and a packet-based format (for communication over the data network 11).

In accordance with some embodiments of the invention, a gateway 32 is also coupled to the data network 11. The gateway 32 is provided as an interface between SIP communications sessions (or other types of communications sessions such as H.323 sessions) and peripheral device data and commands. Such peripheral devices may include USB devices and other types of devices. USB stands for Universal Serial Bus, and a version of USB is described in the "Universal Serial Bus Specification," Revision 1.1, dated September 1998. USB defines a serial bus for interfacing peripheral devices to computer systems. A USB bus includes a four-wire bus that supports isochronous and asynchronous communications that can fan out up to 127 or more devices. USB provides for integrated power for low-power peripheral devices, simple connectors, and hot plug-and-play for easy addition and removal of devices by a user.

The gateway 32 may have a number of USB ports 34A, 34B, and so forth, to which USB devices may be connected. For additional connections of USB devices, a chain of one or more USB hub devices may be coupled, with each hub device offering multiple USB ports. In the example shown in FIG. 1, a USB hub 36 is coupled to the port 34A and a USB device 38 is coupled to port 34B. The USB hub 36 may be coupled to multiple USB devices 40 and 42, as well as to other hub devices (not shown) that can further be connected to more USB devices. A wide variety of USB peripheral devices may be coupled to the gateway 32, including printers, scanners, digital cameras, telephones, keyboards, mice, monitors, joysticks, speakers, and other types of devices.

In addition to USB ports 34A and 34B, the gateway 32 may also include one or more ports 44 for coupling to other types of peripheral devices 46. Such other ports 44 may include parallel ports, serial ports, SCSI (Small Computer Systems Interface) ports, PCMCIA (Personal Computer Memory Card International Association) ports, and so forth.

In accordance with some embodiments, communications sessions may be established between a network element coupled to the data network 11 and one of the USB devices coupled through ports 34A and 34B or one of the other peripheral devices 46 coupled through ports 44. As used here, the ports 34A, 34B, and 44 may be generally referred to as "peripheral links" that peripheral devices may be coupled to. To enable inter-working between a network element and one of the peripheral devices, the network element (such as one of the SIP systems 16 and 20 or the PSTN gateway 22) can establish a SIP call session with the gateway 32. Standard SIP signaling may be used to establish such a call session. The call request (which according to SIP is an Invite request) to initiate the call session with the gateway 32 contains an indication that a communications session with one of the USB devices or other peripheral device is desired. Thus, in response to the request, the gateway 32 establishes a session or connection with the target USB device or other peripheral device. A communications session is thus established between the network element and the peripheral device through the gateway 32.

A USB device or other peripheral device may also cause the gateway 32 to initiate a communications session with a network element on the data network 11.

Once a communications session is established between the SIP system and the peripheral device, data can be exchanged between the SIP system and gateway 32 using SIP messaging and between the gateway 32 and the peripheral device using USB or other signaling. For example, in streaming communications, RTP messages containing audio, video, or other forms of streaming data can be exchanged between the SIP system and the gateway 32. An exchange of other types of data (aside from the streaming data) may also be performed between the SIP system and the gateway 32. For example, such other forms of data may include data containing commands or status information to be communicated with one of the USB or other peripheral devices coupled to ports of the gateway 32.

To communicate such other forms of data between the SIP system and the gateway 32, SIP Info messages may be employed in accordance with one embodiment, which may be used to carry application-level information. The application level information may include commands, status information, and other information. A SIP Info message may be communicated along a SIP signaling path, which is the signaling path established as a result of a SIP call setup. Such an Info message may be referred to as an "in-band" Info message. Alternatively, the SIP Info message may be communicated outside a SIP call session (referred to as an "out-of-band" Info message). The Info message may be exchanged directly between the calling and called systems or through a SIP proxy system.

In an alternative embodiment, after the SIP call setup, instead of using SIP Info messages, a protocol outside of SIP may be used to communicate non-streaming information. One example protocol includes the File Transfer Protocol (FTP), which is described in RFC 959, entitled "File Transfer Protocol (FTP)," dated October 1985. Another example protocol is the Hypertext Transfer Protocol (HTTP), as described in RFC 2068, entitled "Hypertext Transfer Protocol—HTTP/1.1," dated January 1997.

These types of protocols are appropriate for transferring files between Internet applications, including the emerging category of XML (Extensible Markup Language) files that provide a standard way of representing content across Internet applications.

Thus, for example, commands from a SIP system may be communicated through the gateway 32 to one of the peripheral devices to perform a desired action. If the controlled peripheral device is a camera, for example, then the desired action may be to start or stop the camera. The data communicated may also include status information, which, for example, may include the status (e.g., on/off) of various peripheral devices coupled to the gateway 32. The gateway 32 translates between data in SIP format and data in a format for communicating with one of the USB devices or other peripheral devices.

If the gateway 32 is a computer system that is accessible by a user, then a user sitting at the system 32 has access to the features offered by the peripheral devices coupled to the system. In accordance with some embodiments, access to such features is extended to remote network elements coupled to the data network 11. By using network elements that are capable of participating in SIP, H.323, or other call sessions, such remote access of the features of the peripheral devices is made even more convenient and flexible. Examples of network elements include telephony devices, computers, wireless devices, and other types of devices. In one example application, the gateway 32 may be a home system that is coupled to various peripheral devices, such as a security camera, home appliances, telephones, and so forth. A user that is at a remote site away from the home location may be able to access such peripheral devices over the data network 11. Thus, if the user is at work and wishes to turn on the security camera coupled to the gateway 32, the user can establish a call session with the gateway 32 to send the necessary commands to activate the security camera. Video data recorded by the security camera may then be fed in an RTP stream from the gateway 32 back to the SIP system. The user may also call a USB telephone device that is coupled to the gateway 32.

Figure 2:
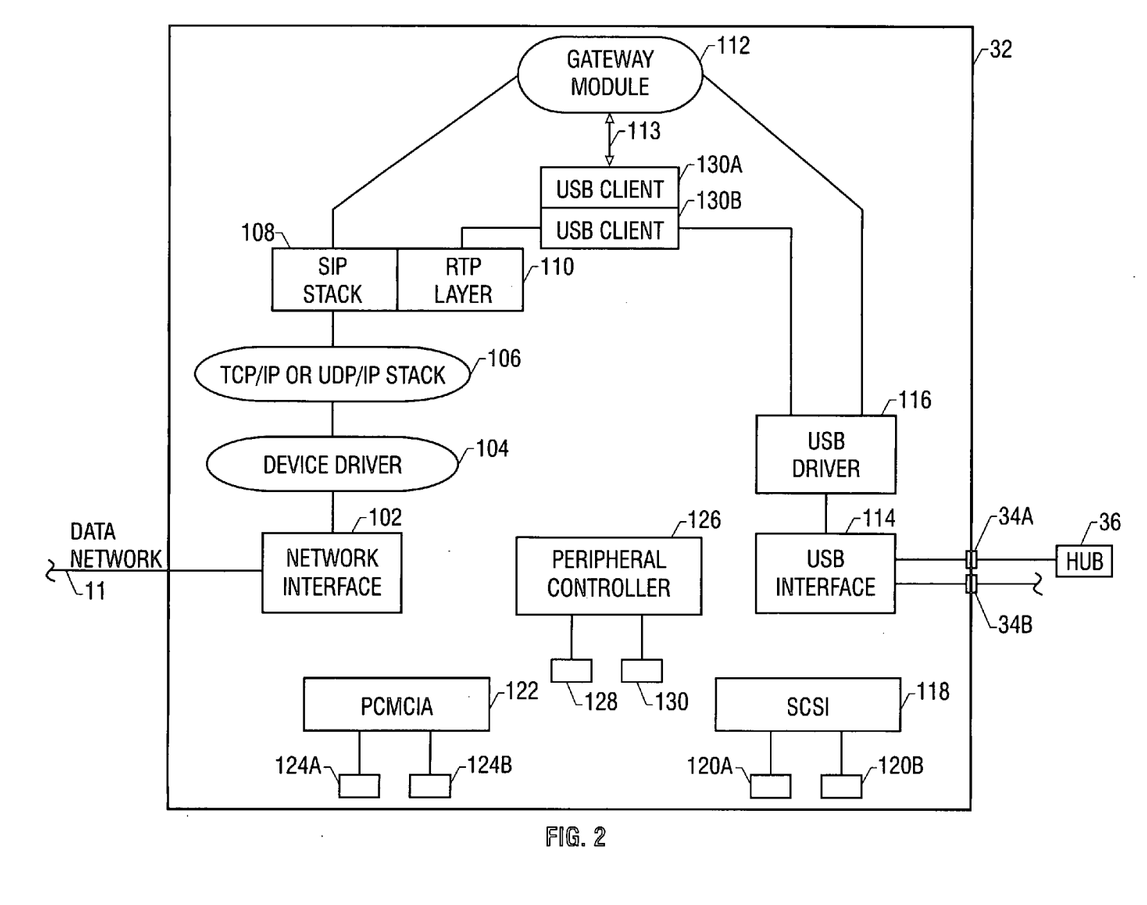
FIG. 2 is a block diagram of the gateway system of FIG. 1 in accordance with an embodiment for enabling communications between Session Initiation Protocol (SIP) systems and Universal Serial Bus (USB) devices.

Referring to FIG. 2, the gateway 32 includes various components. A network interface 102 couples the gateway 32 to the data network 11. Above the network interface 102 is a network device driver 104, a transport and network stack 106 (e.g., a TCP/IP or UDP/IP stack), and a SIP stack 108. An RTP layer 110 may also be included to control communications of RTP data to or from the data network 11. TCP is described in RFC 793, entitled "Transmission Control Protocol," dated September 1981; and UDP is described in RFC 768, entitled "User Datagram Protocol," dated August 1980. TCP and UDP are transport layers for managing connections between end points coupled to an IP network.

A gateway module 112, which may be one or more application routines at the application level, performs the translation of data between a first format (e.g., SIP, H.323, or other format) and a second format (for communication with one of the USB or other peripheral devices).

In the gateway 32, a USB interface 114 is coupled to ports 34A and 34B. Above the USB interface 114 is a USB device driver 116 that provides the interface between the USB interface 114 and the gateway module 112. In addition, USB clients 130A and 130B may be present in the gateway 32. Each USB client 130 may be responsible for the control of a corresponding USB device or group of USB devices. The various layers in a system for interfacing USB devices are discussed in the USB Specification. An interface 113 provides a message communications link between the gateway module 112 and the USB clients 130.

Other interfaces in the gateway 32 include a SCSI interface 118 that is coupled to SCSI ports 120A and 120B, a PCMCIA interface 122 that is coupled to PCMCIA ports 124A and 124B, and a peripheral controller 126 that may be coupled to a parallel port 128, a serial port 130, or other types of ports. The SCSI controller 118, the PCMCIA controller 122, and the peripheral controller 126 are associated with corresponding device drivers (not shown) that enable exchanges of data with the gateway module 112. The other interfaces in the gateway 32 may similarly be connected to various types of peripheral devices that are remotely accessible by SIP, H.323, or other types of network elements.

As used here, the term "peripheral device" may refer to any peripheral or input/output (I/O) device coupled to any port of the gateway 32 (or other type of system). The peripheral device may be located within the system 32 or it may be located outside the system 32 and coupled over some type of a link to the system.

Figure 3:
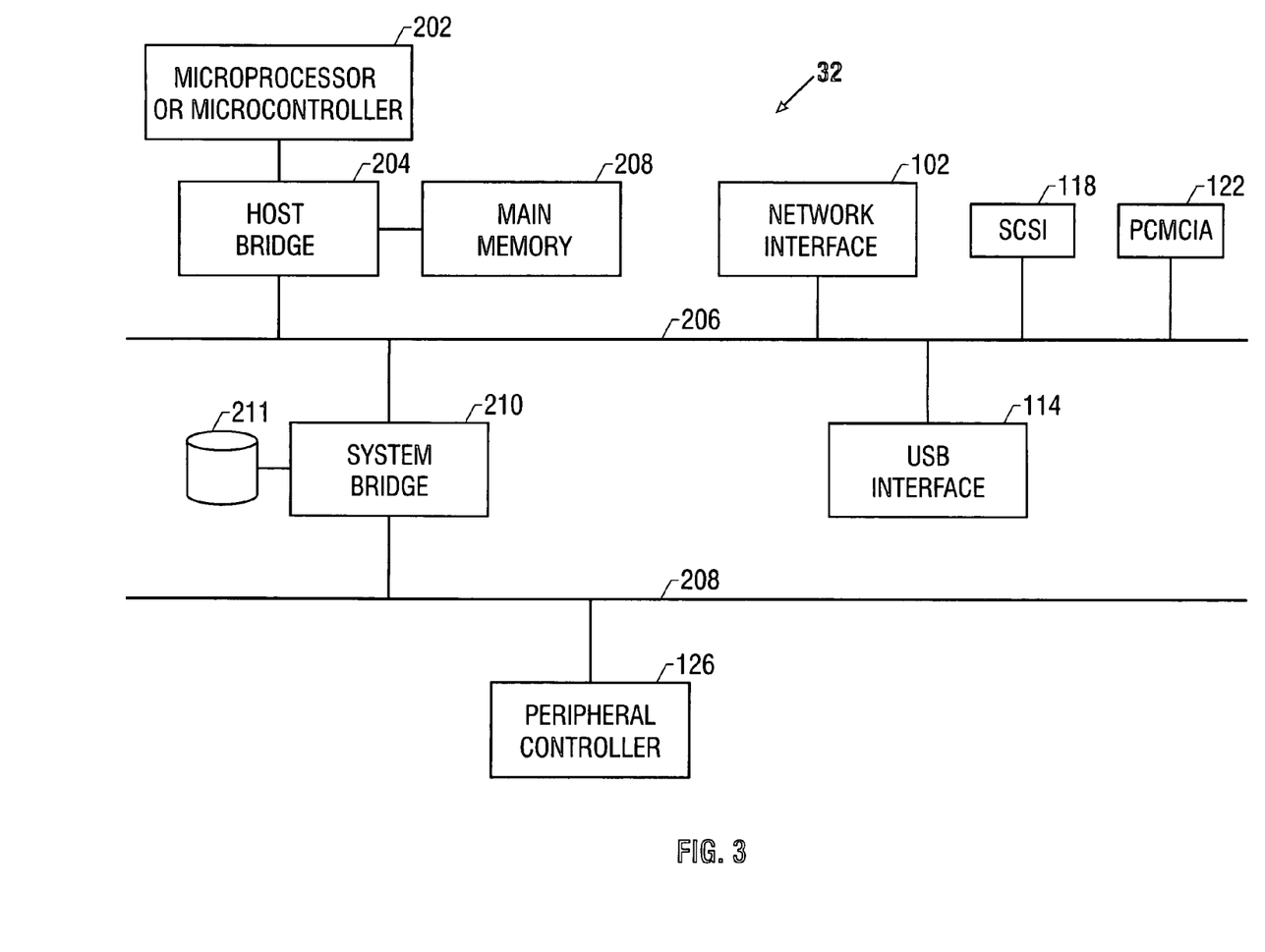
FIG. 3 is a block diagram of an example embodiment of a platform on which the gateway system of FIG. 2 may be implemented.

Referring to FIG. 3, an example architecture of the gateway 32 is illustrated. The gateway 32 may include a microprocessor or microcontroller 202 that is coupled through a host bridge controller 204 to a system bus 206. A main memory 208 may be coupled to a memory controller in the host bridge controller 204. The system bus 206 may be coupled to the network interface 102, the USB interface 114, the SCSI controller 118, and the PCMCIA controller 122. The system 32 may also include another storage device 211, e.g., a hard disk drive, optical medium drive, and so forth. Storage devices in the system 32 may include the device 211, main memory 208, and any other storage media (e.g., caches).

The gateway 32 may also include an expansion bus 208 that is coupled to the system bus 206 by a system bridge controller 210. The peripheral controller 126 may be coupled to the expansion bus 208. Other arrangements of the platform on which the gateway 32 may be employed in further embodiments.

The various components discussed in FIGS. 2 and 3 are capable of performing various tasks. Such components may include hardware components or software components. To perform a specified task, one or more of the components may be involved. As used here, the one or more components may generally be referred to as a "controller." Thus, "controller" may refer to a single software routine or module or a combination of software routines or modules. "Controller" may also refer to combinations of software routine(s) or module(s) and hardware component(s), such as the microprocessor or microcontroller 202.

Figure 4:
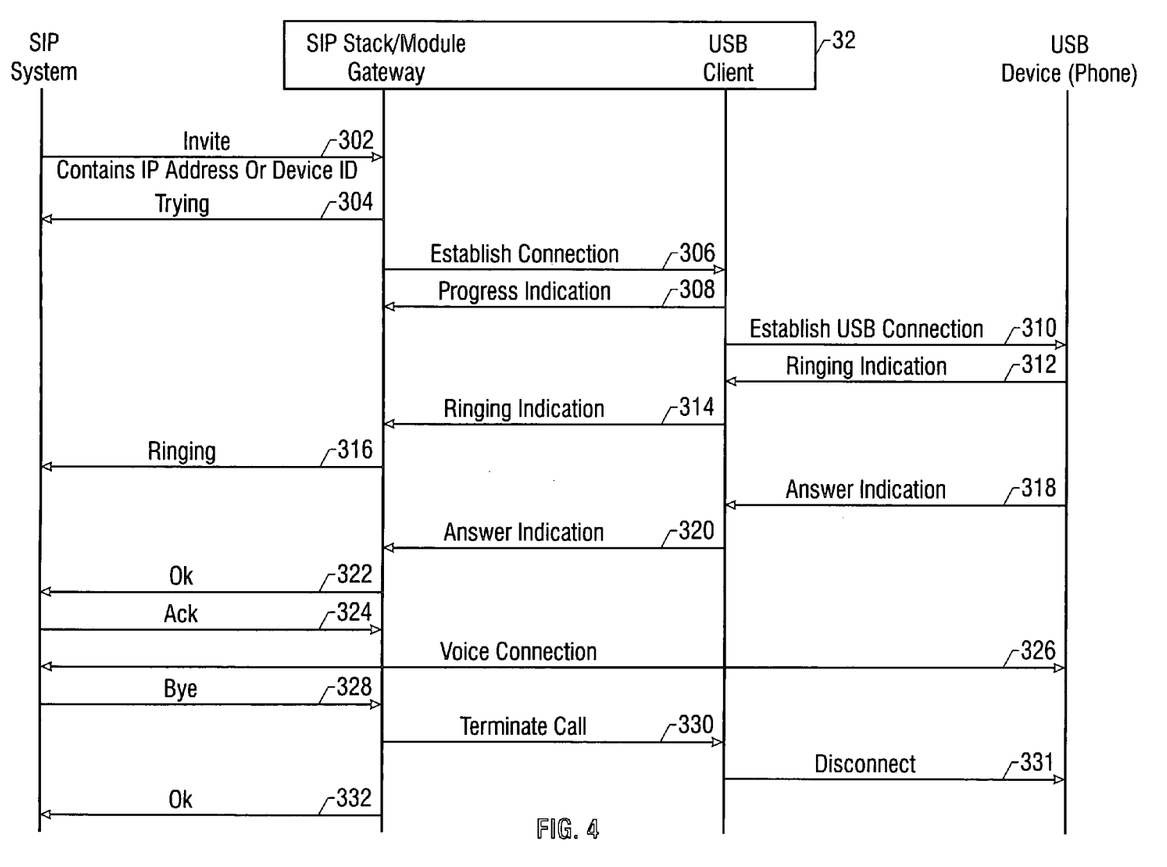
FIG. 4 is a message flow diagram of communications between a SIP system and a USB telephone in accordance with an embodiment.

Referring to FIG. 4, a message flow diagram for establishing a communications session between a SIP system and a USB device through the gateway 32 is illustrated. In the example of FIG. 4, the USB device includes a USB telephone that is capable of participating in a voice call session with the SIP system, which is configured with voice processing capabilities. The SIP system may be a network telephone, a computer with voice processing elements, a wireless telephone, or any other device capable of participating in call sessions over the data network 11. The participants of the message exchange includes the SIP system, the SIP stack 108, the gateway module 112, a USB client 130 (which is located in the gateway 32), and the USB device.

The USB client controls the communication of signaling (control and data) to the USB telephone. For example, the USB client controls the ringing of the USB telephone, activation of the handset/speakerphone, and direction of the audio stream to the handset/speakerphone. The USB client also receives an audio stream from the USB telephone and monitors for actions taken by a user, such as on-hook/off-hook and digit dial events. The USB client collects dialed digits, which are sent to the gateway module 112 for preparation of a SIP Invite request. In creating the SIP Invite request, the collected digits (corresponding to a PSTN number, for example) may be converted to a SIP address. The USB client can also preset SIP commands or destinations associated with presses of speed dial keys on the USB telephone. The speed dial keys may also be used to establish SIP sessions for other devices coupled to the gateway 32 (such as directing audio streams to USB speakers and directing video streams collected by a USB camera to the remote SIP system).

In the example of FIG. 4, the SIP system is the element that initiates the session. In another example, the USB device may be the one initiating the session. The SIP system sends an Invite request (at 302) to the gateway 32 over the data network 11. The Invite message may include an IP address of the gateway 32. In addition, the Invite request may include an identifier associated with the target USB device. The Invite request is a SIP request that indicates that the receiving node is being invited to participate in a call session. The message body of the Invite message contains a description (e.g., in SDP format) of the session to which the receiving node is being invited. This description may be employed to identify the specific USB device.

Under control of the SIP stack 108, the gateway 32 then sends back a Trying response (at 304), which indicates that some unspecified action is being taken on behalf of the call but that the target has not yet been located. The invitation request received by the gateway 32 is passed on to the gateway module 112. The gateway module 112 then sends a message (at 306) to establish a connection with the USB client. The USB client responds with a progress indication (at 308). The USB client may also maintain an indication that it is busy (that is, the USB client is involved in another session). If so, the USB client may return a busy indication. The progress indication may also indicate that call waiting or a multi-line phone capability is enabled in the USB telephone. If call waiting or multiple lines are available, a user at the USB telephone may switch to the current call while placing the other call on hold. One mechanism for implementing this is described in connection with FIG. 5, below.

If the USB client returns a busy indication to the gateway module 112, that indication is communicated to the SIP stack 108 which sends a SIP Busy Here response to the SIP system.

However, if the USB client is able to handle the incoming call request, the USB client sends commands (at 310) to establish a USB connection. Such commands may including commands to ring the USB telephone, activate the handset or speakerphone of the USB telephone, and other actions. The USB device may respond (at 312) with some acknowledgment to indicate that ringing is occurring at the target USB telephone. Upon receipt of the ringing indication, the USB client forwards the ringing indication (at 314) to the gateway module 112. The gateway module 112 forwards this to the SIP stack 108, which sends a SIP Ringing response (at 316) to the originating SIP system. The SIP Ringing response indicates that the called user agent has located a possible location where the target has registered recently and is trying to alert the target.

When a user at the USB telephone answers the call, status information indicating this event (an off-hook event) is sent (at 318) by the USB telephone to the USB client. The USB client forwards the answer indication (at 320) to the gateway module 112. This is forwarded to the SIP stack 108, which then sends a SIP OK response (at 322) to the SIP system to indicate that the Invite request has succeeded. Next, the SIP system sends (at 324) an Ack request to confirm that the SIP system has received a final response to an Invite request. After RTP setup, a voice connection is established (at 326) between the SIP system and the USB client. Voice data may be exchanged between the SIP system and the gateway 32 in RTP format or in any other format for carrying streaming data, and voice data may be exchanged between the gateway 32 and the USB device in USB format.

If the SIP system wishes to terminate the call, it sends a Bye request (at 328) to the gateway 32. In response, the gateway module 112 issues (at 330) a command to terminate the call to the USB client. The USB client sends (at 331) disconnect commands (e.g., disconnect audio stream, or deactivate handset or speakerphone) to the USB device. The gateway 32 then sends (at 332) an OK message back to the SIP system.

The USB client also monitors for a disconnect event at the USB telephone. If such a disconnect event (e.g., on-hook) is received, the USB client informs the gateway module 112, which notifies the SIP stack 108 to cause a SIP Bye request to be sent to the SIP system.

Figure 5:
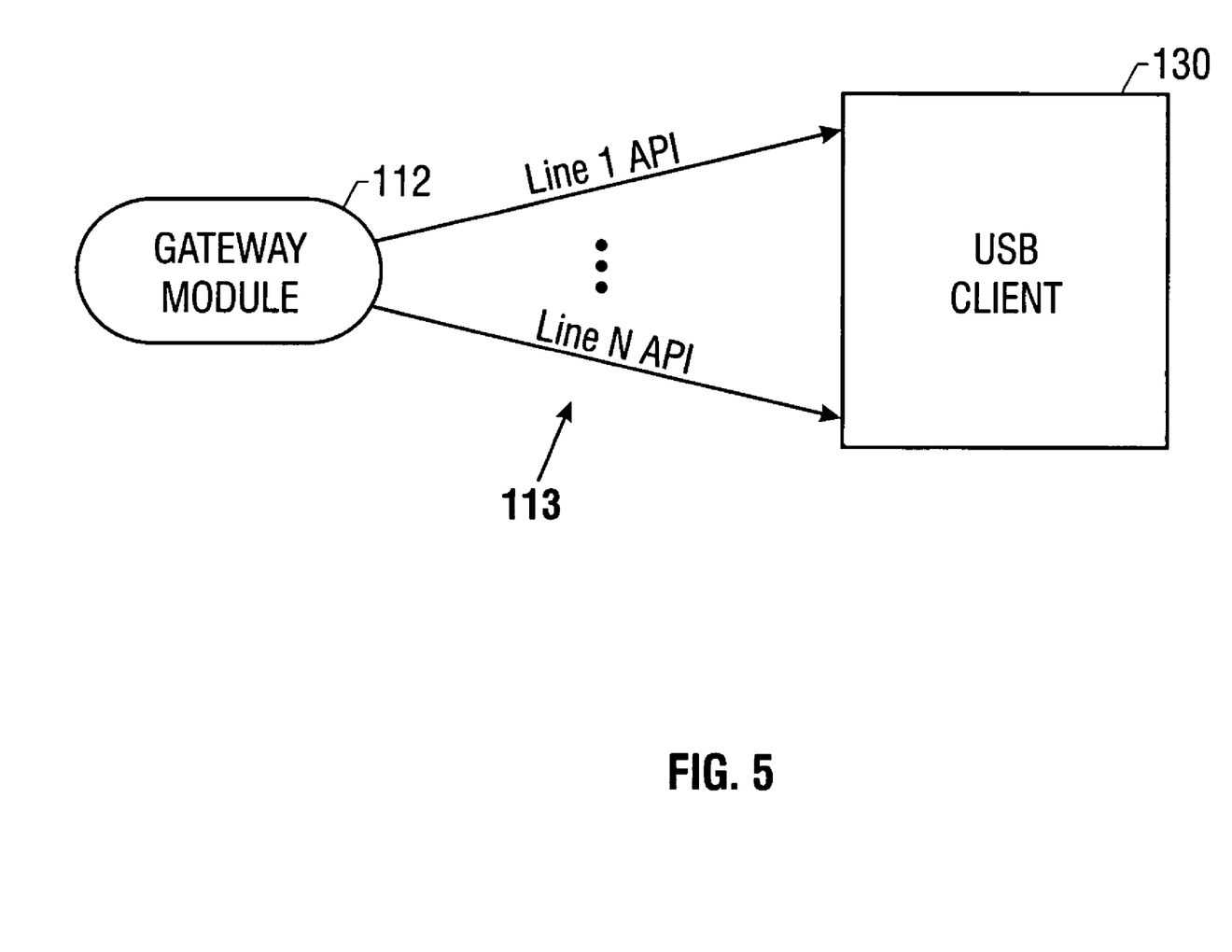
FIG. 5 illustrates an interface between a gateway module and USB client in the gateway system of FIG. 2.

Referring to FIG. 5, the USB telephone may have multi-line capability. Thus, even though the user at the USB telephone may be speaking on a first line, a call indication may be received over another line. To provide the multi-line capability in the gateway 32, the interface 113 between the gate module 112 and USB client 130 corresponding to the USB telephone may include multiple application programming interfaces (APIs). Each individual API corresponds to a line of the USB telephone. Thus, as illustrated in FIG. 5, a line 1 API corresponds to a first line, and a line N API corresponds to the Nth line, where N can be two or more. Thus, when an incoming call from the SIP system is received by the gateway module 112, the gateway module 112 establishes a connection with the USB client 130 over an available API. Each API may be associated with a different SIP uniform resource locator (URL). Alternatively, calls may overflow from one line (a first API) to another line (another API).

The gateway 32 is also capable of supporting conferencing. In conferencing, a SIP server may receive Invite requests from two or more clients to participate in the call session. As a result, three or more participants may be involved in the call session. In this case, the gateway 32 needs to handle two or more separate audio streams that may come in over the data network 11 from the two or more other participants. The multiple API lines as disclosed in FIG. 5 may also be employed to handle such a conferencing call session, in which a first incoming audio stream may be routed over a first API and another incoming audio stream may be routed over a separate API.

Figure 6:
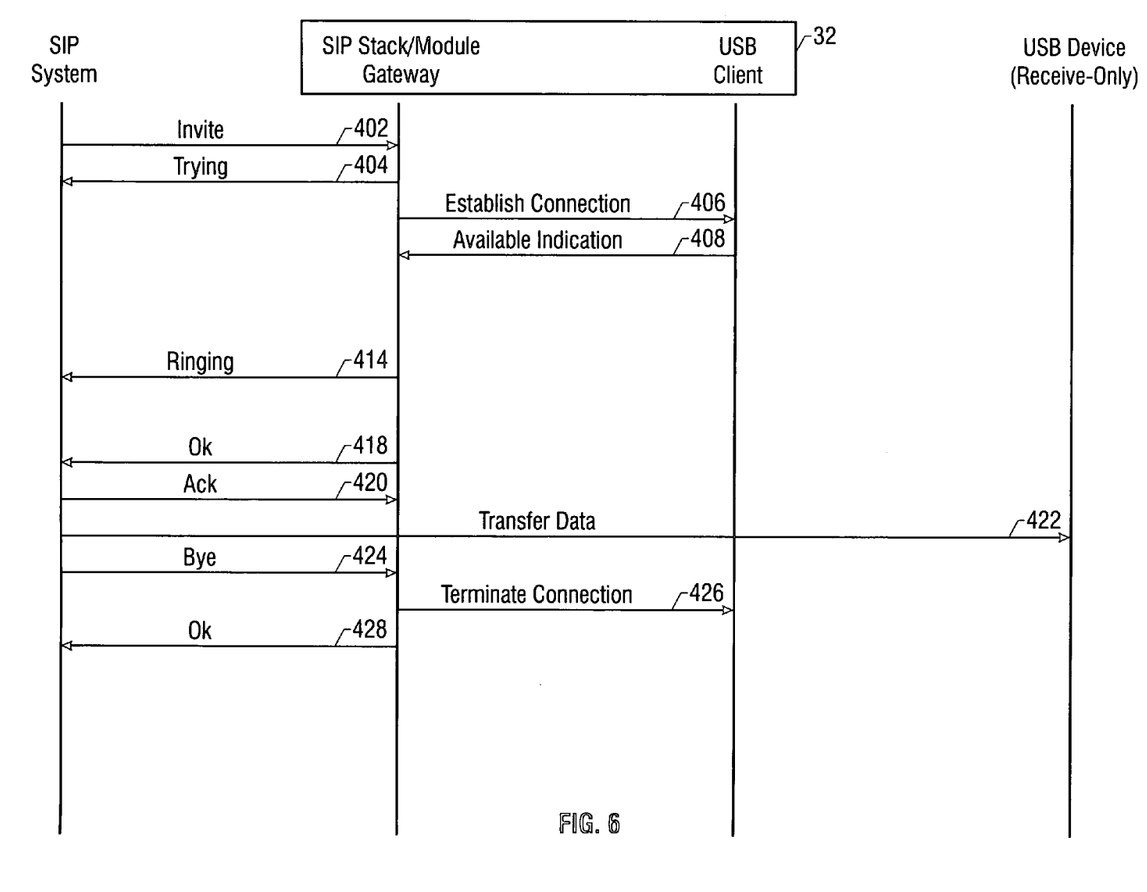
FIG. 6 is a message flow diagram of communications between a SIP system and a receive-only USB device in accordance with an embodiment.

Referring to FIG. 6, in accordance with another embodiment, a communications session between a SIP system and a USB client that is a non-telephony device is illustrated. In the example of FIG. 6, the USB device is a "receive-only" device, such as a USB speaker, a disk drive used as a drop-box or answering machine, a USB display, or other like devices. To access the USB device from the SIP system, the SIP system first sends an Invite request (at 402) to the gateway 32. The SIP stack 108 returns a Trying response (at 404) to the SIP system. The invitation request is forwarded by the SIP stack 108 to the gateway module 112, which attempts to establish a connection with the USB client (at 406) that corresponds to the receive-only USB device. The USB client maintains an indication of whether the USB device is being used. If the USB device is idle, then the USB client sends an available indication (at 408) to the gateway module 112. This is forwarded by the gateway module 112 to the SIP stack 108, which returns a SIP Ringing response (at 414) to the SIP system. This is followed by a SIP OK response (at 418) from the gateway 32 to the SIP system. The SIP system then returns an Ack request (at 420) back to the gateway 32. At this point, transfer of data may occur (at 422) from the SIP system to the receive-only USB device. In one example, if the receive-only USB device includes USB speakers, then an audio stream in RTP format may be communicated from the SIP system to the gateway 32. The RTP data is received by the RTP layer 110 (FIG. 2) in the gateway 32, which sends the data onto the USB client corresponding to the USB speakers. The USB client converts the incoming audio stream into the USB speaker data flow format, which may be raw PCM (pulse-code modulation).

The SIP system may terminate the call by sending a Bye request (at 424) to the gateway 32. In response, the gateway module 112 sends a terminate connection command (at 426) to the USB client. The SIP stack 108 may also send back an OK response (at 428) to the SIP system. Additionally, if the USB device (e.g., speakers) is powered off or otherwise disconnected from the system, the USB driver stack notes such disconnection and can cause a Bye sequence to be initiated.

As noted above, the USB device may be busy if it is already in use in another session when a current Invite request is received by the gateway 32. One way of noting that the USB device is in the busy state is by noting that the USB device is in the Configured USB state. One way of noting that the USB device is in the idle state (available), is to set the USB device to the Addressed, but not Configured USB state. If the USB device is busy, then the USB client may send a busy indication back to the gateway module 112, instead of the available indication sent at 408 in FIG. 6. The gateway module 112 forwards this busy indication to the SIP stack 108, which may return a Busy Here response instead of the Ringing or OK responses sent at 414 and 418 in FIG. 6.

In another arrangement, a current session may be over-ridden by a new session. Thus, in this other arrangement, if the gateway 32 receives a new Invite request while a current session is active, the SIP gateway 32 may send a SIP Bye request to the remote SIP system involved in the current SIP session to close the communication session. As the current communication session is being terminated, the gateway 32 may participate in an exchange of SIP protocol messaging with the SIP system that originated the new Invite request to start the establishment of the new session. Thus, once the previous session is closed, the SIP Ringing and OK responses may be sent by the gateway 32 to the new SIP system. Whether a current session is to be over-ridden by a new session may be according to policies set by the user or a system administrator. Such policies may rely on the identity of the originating system. Thus, for example, certain calling parties may have higher priority then other calling parties.

As in the case of an interactive session between a SIP system and a USB telephone as discussed in connection with FIG. 4, a conferencing session may be established in which multiple remote SIP systems may send separate audio streams for output on a single set of speakers. According to a first technique, the USB client responsible for the speakers may be implemented as a conferencing-type bridge in which the audio streams from the separate sources are merged for output on the USB speakers. Alternatively, according to another technique, the separate audio streams may be played separately on corresponding separate (e.g., stereo) speakers. Thus, if the USB device includes two speakers, and two audio streams are received, then a first audio stream may be output on a first speaker while a second audio stream is output on a second speaker.

The USB client may also be programmable to handle either of these two techniques. This may be accomplished by using multiple APIs between the gateway module 112 and the USB client, similar to the multiple APIs employed in the interface 113 as shown in FIG. 5. Thus, in the example where the USB device includes two speakers, a first API may be used to cause the USB client to act as a conferencing-type bridge, a second API may be used to send an audio stream to a left speaker, and a third API may used to send an audio stream to a right speaker. The several APIs may have different corresponding SIP URLs. Thus, a bridging request may use a first URL, e.g., bridge.speakers@doe.nortelnet-works.com to set up streams for bridging functions. The second API may have the example URL left.speakers@doe.nortelnetworks.com to route data to the left speaker, while the third API may have the example URL right.speakers@doe.nortelnetworks.com to route data to the right speaker.

Figure 7:
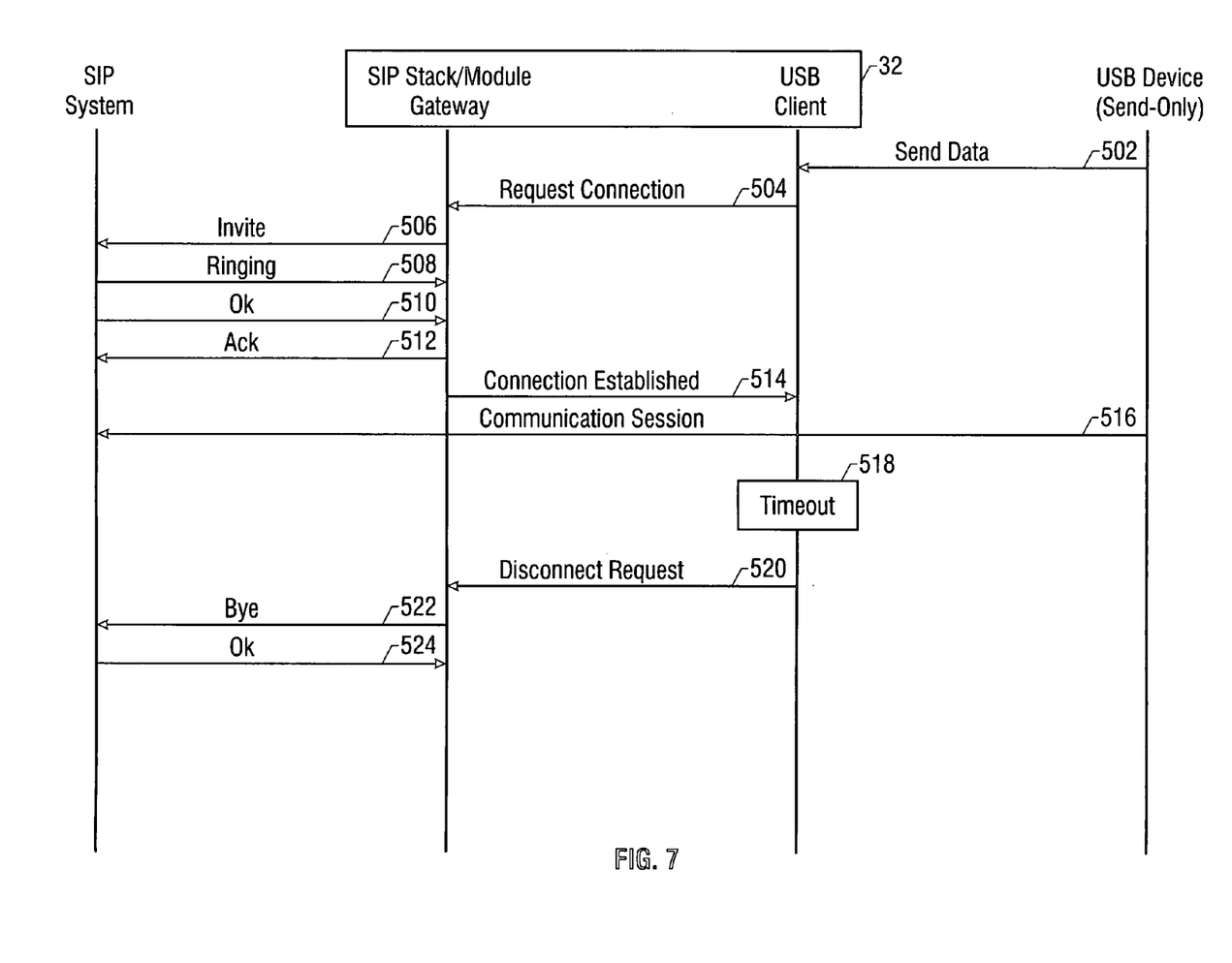
FIG. 7 is a message flow diagram of communications between a SIP system and a send-only USB device in accordance with an embodiment.

Referring to FIG. 7, a communications session between a send-only USB device and a remote SIP system through the gateway 32 is illustrated. An example of a send-only device may be some monitoring device that sends data out whenever something new is detected. For example, the send-only device may include a motion sensor that normally is inactive but transmits data when it detects motion. In FIG. 7, it is assumed that a communications session is not active between the SIP system and the send-only USB device when the USB device initially transmits data (at 502) to the USB client. In response, the USB client sends a request connection message (at 504) to the gateway module 112, which forwards the request to the SIP stack 108. The SIP stack 108 packages the request into an Invite request that is sent (at 506) to a preselected SIP system. The gateway 32 may store some indication that the preselected SIP system is to be contacted if data is received from the particular send-only USB device. The SIP system sends back a Ringing response (at 508) followed by sending an OK response (at 510). The SIP stack responds to the OK response by sending an Ack request (at 512) to the SIP system. The SIP stack 108 also forwards receipt of the OK response to the gateway module 112, which communicates a connection established message (at 514) to the USB client. At this point, a communications session is established (at 516) in which the data sent by the USB device may be transmitted to the SIP system through the gateway 32.

The USB client may include some type of a timeout mechanism. Thus, if the send-only USB device does not send data within some period of time, a timeout condition occurs (at 518) which causes the USB client to send a disconnect request to the gateway module 112. This disconnect request is sent (at 520) to the SIP stack 108, which issues a Bye request (at 522) to the SIP system. The SIP system then responds with an OK response (at 524).

The USB client may also be capable of sending to multiple destinations. Thus, for example, the USB client may be a camera that sends multiple, duplicated video streams to specified destination devices. Alternatively, the USB client may send a multicast stream that can be received by multiple destination devices.

Figure 8:
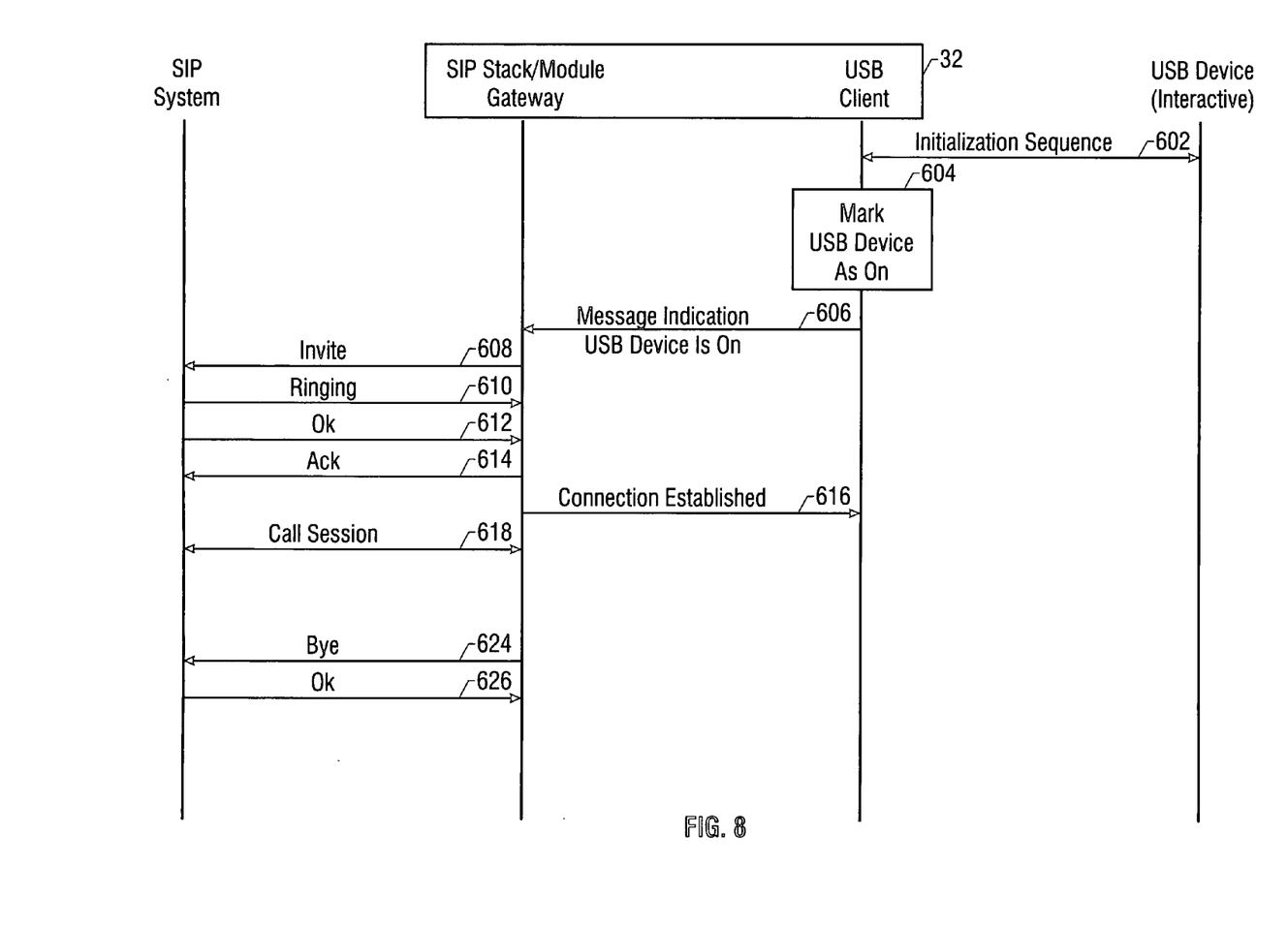
FIG. 8 is a message flow diagram of communications between a SIP system and an interactive USB device in accordance with an embodiment.

Referring to FIG. 8, another example involves an interactive USB device that is a non-telephony device. The interactive USB device is capable of receiving data from and sending data to a remote SIP system. The interactive USB device is also capable of causing initiation of a communication session with the remote SIP system in response to certain events occurring at the USB device. One example is the toggling of the USB device between on and off states. Thus, for example, if the USB device is initially in the off state and it is turned on, an initialization sequence may occur between the USB device and the USB client (at 602). After the initialization sequence, the USB client marks the USB device as being on (at 604). In addition, the USB client sends a message indicating that the USB device has been turned on (at 606) to the gateway module 112.

The gateway module 112 identifies the remote SIP system to be addressed, and sends a request on to the SIP stack 108. The SIP stack 108 sends a corresponding Invite request (at 608) to the identified remote SIP system. The remote SIP system returns a Ringing response (at 610) followed by an OK response (at 612). The SIP stack 108 returns an Ack request (at 614) to the SIP system. The OK response received from the remote SIP system is also forwarded by the SIP stack 108 to the gateway module 112, which then sends an indication that the call session has been established with remote SIP system (at 616). Following transmission of the Ack request, a call session is established (at 618) between the SIP system and the gateway module 112. In the call session 618, the gateway module 112 may send the message that the USB device is on to the remote SIP system. Such a message may be sent in a SIP Info message. Following this, the USB client may request that the gateway module 112 and SIP stack 108 terminate the call session with the SIP system. This may be accomplished by the SIP stack 108 sending a Bye request (at 624), with the SIP system returning an OK response (at 626).

Another type of send-only USB device may be those that are transmitting continuously. Examples of such USB devices include microphones and video cameras (e.g., security cameras). Since such send-only devices are transmitting continuously, a communications session may be actively maintained between the USB-only device and the remote SIP system. The continuous stream of data is communicated from the USB device to the gateway 32, which converts the stream of data into RTP format for communication to the SIP system.

Additionally, should a gateway have a number of USB peripherals attached, SIP may be used to set up inter-device communications within the gateway itself. As an example, should a user press a play button on a USB CD drive, the corresponding USB client could initiate a SIP Invite to an adjacent pair of USB speakers to render the audio stream. This type of inter-machine communications is easily facilitated through the Sockets communication layer of modern operating systems which allows multiple processes to communicate with IP style communications without actually sending IP communications over an external communications link.

Figure 9:
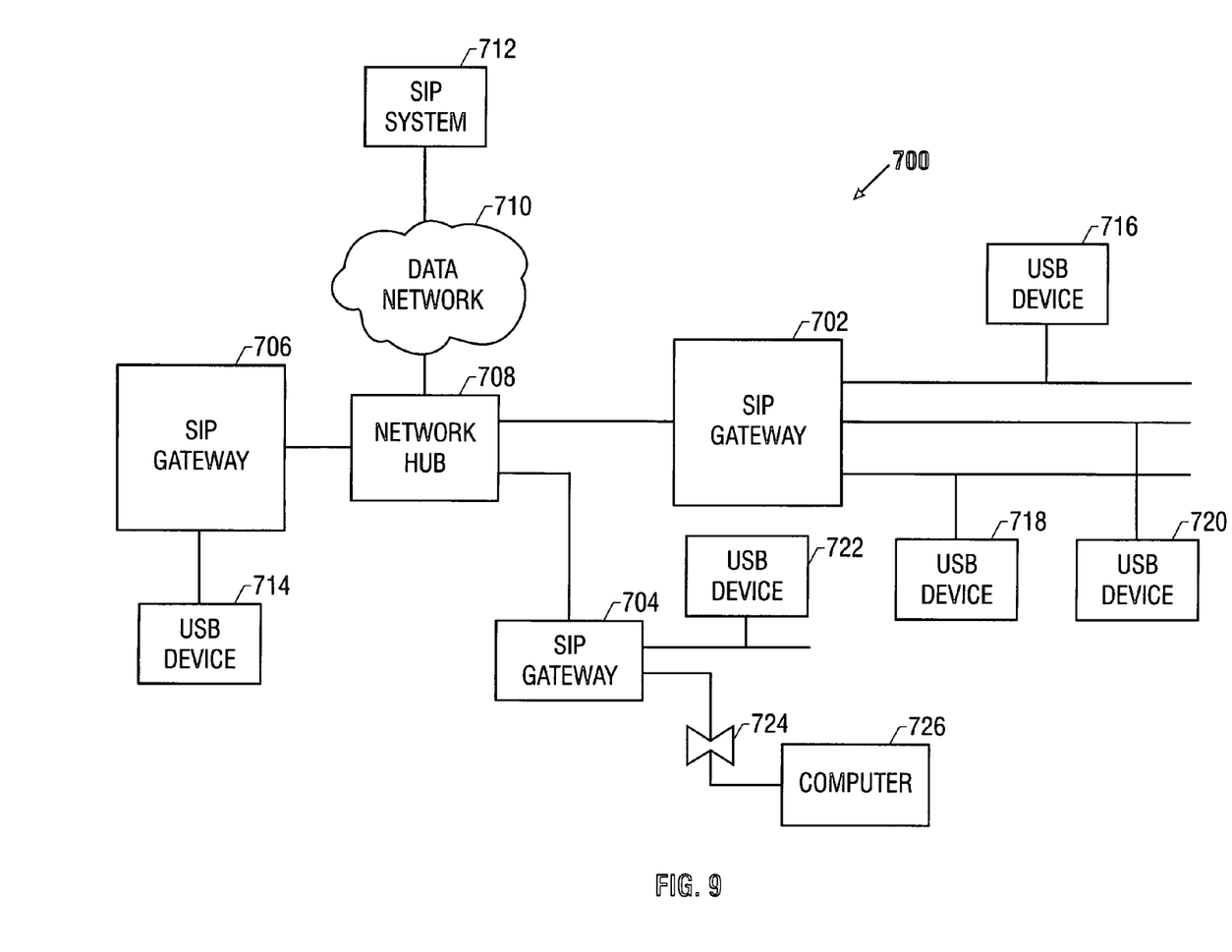
FIG. 9 is a block diagram of another arrangement of a communications system including plural gateway systems according to an embodiment.

Referring to FIG. 9, a communications system 700 according to another embodiment is illustrated. In this embodiment, plural gateways 702, 704, and 706 are present that are capable of converting between SIP messaging and data to be communicated to USB and peripheral devices. The gateways 702, 704, and 706 are coupled to a network hub 708, which is turn is coupled over a data network 710 to one or more SIP systems 712. Each of the gateways is coupled to respective USB devices. Thus, for example, the gateway 706 is coupled to a USB device 714, and the gateway 702 is coupled to USB devices 716, 718, and 720. The gateway 704 is coupled to a USB device 722. In addition, the gateway 704 is coupled through a bridge 724 to a computer 726. The bridge 724 may convert between data communicated according to USB format and data that is communicated to a port of a computer 726, which may be a modem port.

In the communications system 700, the one or more SIP systems 712 may be capable of communicating with any one of the USB devices coupled to respective gateways as discussed above. In addition, each of the USB devices coupled to one gateway may be capable of communicating with another USB device coupled to another gateway.

The various software layers, routines, or modules described herein may be executable on various processing elements, such as the microprocessor or microcontroller 202 in FIG. 3 (which may be generically referred to as a control unit). The control unit may be coupled to a storage device to store instructions and data associated with the software layers, routines, or modules. As used here, a "controller" may refer to software, hardware, or a combination of software and hardware.

The storage device may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software layers, routines or modules in the various network elements may be stored in respective storage devices. The instructions when executed by a respective control unit cause the corresponding network element to perform programmed acts.

The instructions of the software layers, routines, or modules may be transported to the network element in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communications between a first device and a Universal Serial Bus (USB) peripheral device over a network, comprising:
   receiving, by a system, a message from the first device to establish a communications session with the USB peripheral device, the message being according to a first telephony protocol defining real-time interactive sessions;
   establishing a communications session between the first device and the system over the network; and
   converting, in the system, between data according to the first telephony protocol and data according to a second protocol that defines a USB peripheral link from the system to the USB peripheral device,
   wherein establishing the communications session includes establishing one of a Session Initiation Protocol session and an H.323 session.

2. The method of claim 1, wherein establishing the communications session includes establishing a streaming call session.

3. The method of claim 1, further comprising sending one or more commands to the USB peripheral device to control operation of the USB peripheral device.

4. The method of claim 1, further comprising sending status information of the USB peripheral device to the first device.

5. The method of claim 1, further comprising establishing a real-time call session between the first device and the USB peripheral device.

6. The method of claim 1, wherein establishing the communications session includes establishing a conferencing session among the first device, the USB peripheral device, and another device.

7. The method of claim 6, wherein establishing a conferencing session includes establishing a multicast session.

8. The method of claim 1, further comprising:
establishing a communications session between the first device and a second system; and
converting, in the second system, between data according to the first protocol and data according to the second protocol.

9. A method of communications between a first device and a peripheral device over a network, comprising:
receiving, by a system, a message from the first device to establish a communications session with the peripheral device, the message being according to a first protocol defining real-time interactive sessions;
establishing a communications session between the first device and the system over the network; and
converting, in the system, between data according to the fist protocol and data according to a second protocol that defines a peripheral link from the system to the peripheral device;
wherein receiving the message includes receiving a Session Initiation Protocol message; and
wherein the peripheral link is selected from the group consisting of a Universal Serial Bus port, a parallel port, a serial port, a Small Computer Systems Interface port, and a Personal Computer Memory Card International Association port.

10. The method of claim 9, wherein converting the data includes converting between a Session Initiation Protocol format and a Universal Serial Bus format.

11. A method of communications between a first device and a peripheral device over a network, comprising:
receiving, by a system, a message from the first device to establish a communications session with the peripheral device, the message being according to a first protocol defining real-time interactive sessions;
establishing a communications session between the first device and the system over the network;
converting, in the system, between data according to the first protocol and data according to a second protocol that defines a peripheral link from the system to the peripheral device;
receiving another message to establish a second communications session while the first communication session is active; and
performing one of sending a busy indication and overriding the first communications session.

12. A system comprising:
a first interface capable of communicating with a packet-based network according to a first protocol that defines real-time interactive communications sessions received over the packet-based network;
a second interface capable of communicating with a peripheral device according to a second protocol; and
a controller to convert a message according to the first protocol to data according to the second protocol for communicating to the peripheral device;
wherein the peripheral device includes a Universal Serial Bus device,
wherein the first protocol includes one of a Session Initiation Protocol and an H.323 Recommendation.

13. The system of claim 12, wherein the second interface includes a Universal Serial Bus interface.

14. The system of claim 13, further comprising a Universal Serial Bus client to manage communications with the peripheral device.

15. The system of claim 14, further comprising an interface between the controller and the Universal Serial Bus client, the interface including one or more application programming interfaces.

16. The system of claim 15, wherein plural application programming interfaces are assigned different uniform resource locators.

17. A system comprising:
a first interface capable of communicating with a packet-based network according to a first protocol that defines real-time interactive communications sessions received over the packet-based network;
a second interface capable of communicating with a peripheral device according to a second protocol;
a controller to convert a message according to the first protocol to data according to the second protocol for communicating to the peripheral device; and
a Session Initiation Protocol stack to process Session Initiation Protocol messages,
wherein the second interface is selected from the group consisting of a Universal Serial Bus port, a parallel port, a serial port, a Small Computer Systems Interface port, and a Personal Computer Memory Card International Association port.

18. The system of claim 17, wherein the second interface is adapted to receive an indication of a status change of the peripheral device, the controller adapted to send one or more messages to a remote device over the packet-based network concerning the status change.

19. The system of claim 17, wherein the data communicated to the peripheral device includes a command to control operation of the peripheral device.

20. The system of claim 17, wherein the controller is adapted to establish a real-time interactive call session with a remote device coupled to the packet-based network and the peripheral device.

21. A method of accessing a non-telephony device coupled to a system over a link defined according to a first protocol, comprising:
receiving, by the system, a message from a telephony device, the message defined according to a telephony protocol; and
converting the telephony protocol message into data according to the first protocol for communication over the link to the non-telephony device;
wherein the first protocol includes a Universal Serial Bus protocol;
wherein receiving the message includes receiving a Session Initiation Protocol Invite request.

22. The method of claim 21, further comprising sending, in response to the received message, one or more commands to the non-telephony device to perform one or more predetermined actions by the non-telephony device.

23. An article including one or more machine-readable storage media containing instructions for controlling a system coupled to a packet-based network and a peripheral link, the instructions when executed causing the system to:
communicate a message over the packet-based network, the message defined according to a Session Initiation Protocol;
convert between the message and data according to a second protocol defining communications over the peripheral link; and communicate the data over the peripheral link, the peripheral link selected from the group consisting of a Universal Serial Bus port, a parallel port, a serial port, a Small Computer Systems Interface port, and a Personal Computer Memory Card International Association port.

24. The article of claim 23, wherein the one or more storage media contain instructions that when executed cause the system to communicate a command to control operation of a peripheral device coupled to the peripheral link.

25. The article of claim 23, wherein the messages according to the Session Initiation Protocol and the data according to the second protocol are part of a voice-based call session.

26. The article of claim 23, wherein the one or more storage media contain instructions that when executed cause the system to receive data from the peripheral link indicative of a status change of a peripheral device coupled to the peripheral link.

27. The article of claim 23, wherein the second protocol includes a Universal Serial Bus protocol.

28. A data signal embodied in a carrier wave comprising one or more code segments containing instructions for controlling a system coupled to a packet-based network and a peripheral link, the instructions when executed causing the system to:
- receive a message from a first device to establish a communications session with a Universal Serial Bus (USB) peripheral device, the message being defined by a first telephony protocol defining real-time interactive sessions;
- establish a communications session between the first device and the system over the network; and
- convert between data according to the first telephony protocol and data according to a USB protocol defining a peripheral link from the system to the USB peripheral device;
- wherein receiving the message comprises receiving a Session Initiation Protocol message.

\* \* \* \* \*